No. 895,238. PATENTED AUG. 4, 1908.
C. W. BROWN.
TYPE WRITING MACHINE.
APPLICATION FILED JAN. 30, 1901.

WITNESSES:

INVENTOR
Chester W. Brown

No. 895,238. PATENTED AUG. 4, 1908.
C. W. BROWN.
TYPE WRITING MACHINE.
APPLICATION FILED JAN. 30, 1901.

WITNESSES:

INVENTOR
Chester W. Brown

No. 895,238. PATENTED AUG. 4, 1908.
C. W. BROWN.
TYPE WRITING MACHINE.
APPLICATION FILED JAN. 30, 1901.

WITNESSES:
Mrs. Jennie Harper
Harrie R. Brown

INVENTOR
Chester W. Brown

UNITED STATES PATENT OFFICE.

CHESTER W. BROWN, OF JACKSON, MICHIGAN, ASSIGNOR TO WYCKOFF, SEAMANS & BENEDICT, OF ILION, NEW YORK, A CORPORATION OF NEW YORK.

TYPE-WRITING MACHINE.

No. 895,238.

Specification of Letters Patent.

Patented Aug. 4, 1908.

Application filed January 30, 1901. Serial No. 45,385.

*To all whom it may concern:*

Be it known that I, CHESTER W. BROWN, a citizen of the United States, residing at the city of Jackson, in the county of Jackson and State of Michigan, have invented certain new and useful Improvements in Type-Writing Machines, of which the following is a specification.

This invention relates to type-writers and it has specific reference to the spacing mechanism, the object of the invention being to provide an escapement mechanism wherein the carriage will be moved to different degrees corresponding to the various widths of the different letters and characters to be written.

As type-writers are usually built, the carriage is moved a certain definite distance each time a key or the spacing bar is struck, and in consequence, there is not that uniform appearance that is found in matter printed from ordinary type. With the present construction, the type have the proper relative widths, and the carriage is fed correspondingly, so that the matter written resembles closely ordinary printed matter.

In the drawings forming a portion of this specification and in which like numerals of reference indicate similar parts in the several views: Fig. 10 is an elevation showing the face of a type of a double shift machine. Fig. 11 is an elevation showing the limber pawl with the parts thereof disassembled. Fig. 12 is an elevation showing a modification of stiff-pawl with parts disassembled. Fig. 13 is an edge view of the limber pawl, shown in Fig. 11. Fig. 14 is an edge view of the pawl shown in Fig. 12. Fig. 15 is a rear view of the latch for preventing recoil of the carriage when the latter is set back. Fig. 16 is a side view of the structure shown in Fig. 15. Fig. 17 is a top plan view of the construction shown in Fig. 15. Fig. 18 is a top plan view showing a key for striking both the lower case and the upper case letter, the spacing for the two letters being indicated on the key. Fig. 19 is a plan view showing a key for a double shift machine to print both the upper and lower case letters and in addition thereto a character for punctuation, the spacing for the two letters and one punctuation being indicated on the key. Fig. 20 is an elevation showing a modification of escapement wheel wherein teeth or pins on the side of the wheel are substituted for the usual peripheral teeth. Fig. 21 is a side elevation of a key-lever, showing the manner of attaching the rods 12, etc., thereto. Fig. 22 is an end elevation of the same. Fig. 23 is an elevation of the escapement wheel, the cover being broken away to illustrate the inclosed ratchet mechanism which permits of rotation of the said wheel in one direction in order that the carriage may be moved backwardly slightly without necessitating raising the feed rack from engagement with the feed pinion on the escapement-wheel shaft. Fig. 24 is an elevation showing a scale designed for use in connection with the present mechanism.

Referring now to the drawings, A represents the frame of the type-writer to which the attachment is connected, and B is the drum containing the feeding spring and on which is wound one end of the feeding strap, the opposite end of this strap, which is shown at $a'$, being attached to the carriage for moving the latter forwardly during the progress of the writing. This step by step movement of feed of the carriage, is secured in the present instance by means of such mechanism as will permit of different degrees of movement of the carriage to correspond to type of different widths.

In the usual construction of type-writer, the successive steps of the carriage are all of the same length, but in the present instance, a unit of feed is adopted, and for each type struck there are a corresponding number of units of feed, so that the different steps in the movement of the carriage may or may not be of the same length, depending upon the width of the type struck. The mechanism by which this variation in feed is secured comprises an escapement shaft M which is journaled in the frame of the machine and which carries a pinion 28 at its forward end that meshes with a rack upon the carriage.

Mounted loosely on the shaft M is an escapement wheel 1 carrying a ratchet wheel 48 on the rear thereof and a spring-pressed pawl 49 which engages the ratchet wheel 48, is attached to the cap 23 which in turn is fastened to the shaft M. This pawl is so disposed, that when the carriage is retracted, the escapement shaft will turn freely of the escapement wheel, while the pawl will prevent free rotation of the shaft with respect to the escapement wheel in the opposite direction a system of pawls and tumblers being provided to permit of step by step rotation of the escapement wheel to permit of forward feeding of the carriage.

The type-writer is provided with the usual rock-shaft O' having the tension spring L and its adjusting screw I, this spring being adapted to hold the shaft yieldably in a predetermined position. Extending upwardly from the shaft O' and at right angles thereto, is a rocker arm O which carries a rigid pawl 9 which moves with the arm in a plane at right angles to the escapement wheel, into and out of engagement with the escapement wheel.

Figures 11, 12, 13, 14, 15, 16, 17, 20, 21, 22, 23, 24:
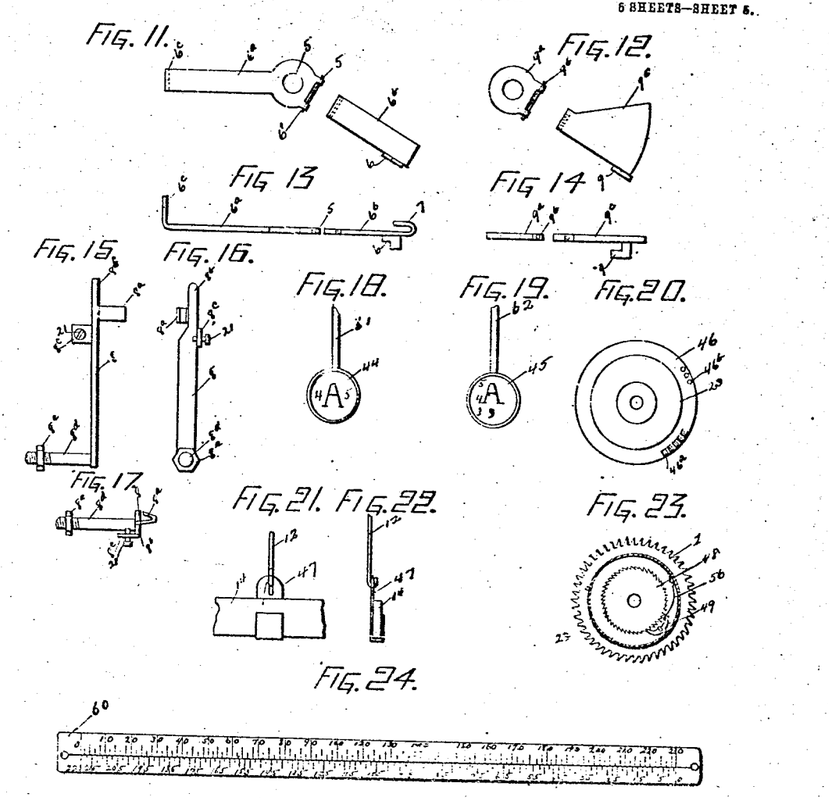

Mounted loosely upon the hub of the escapement wheel and held in place by the nut 31, is a hub 5', shown in Fig. 11, and having spaced ears 6' with which is engaged a pintle 5, and on this pintle is pivoted a pawl 6$^b$ having a laterally projecting tooth 6 which is adapted for movement into and out of engagement with the escapement wheel, alternately with the rigid pawl 9. On the rear face of the pawl 6$^b$ is formed a hook 7 by bending the end of the plate upwardly to lie parallel with the body of the pawl, and this hook is engaged over an arc-shaped guide-bar 17 that is carried by the rocker arm O. With this construction, as the arm O is rocked, the pawl 6$^b$ is rocked on the pintle 5 to move the tooth 6 into engagement with the escapement wheel when the pawl 9 is moved from engagement therewith, and vice versa, but at the same time, said guide bar 17, does not prevent rotatable movement of the limber pawl 6$^b$ with the hub 5' on the escapement shaft. Thus, when the rigid pawl 9 is in engagement with the escapement wheel, said wheel, and therewith the escapement shaft, is held against rotation and the carriage against movement, but when the rigid pawl is moved from engagement with the escapement wheel and the limber pawl is moved into engagement therewith, the escapement wheel may rotate and carry the limber pawl rotatably with it, until the limber pawl is stopped. Thus the rocker arm O, by means of the curved guide 17 attached thereto, which engages the hooked portion of the loose pawl 6$^b$, pushes the loose pawl out of engagement with the escapement wheel whenever the fixed pawl is moved forward into engagement therewith by the rocker arm in printing, and also moves the loose pawl backward into engagement with said wheel, whenever the fixed pawl is moved backward out of engagement with said wheel when the key is released in printing. The rotating movement of said loose pawl by which it moves backward to space off the teeth necessary for an escapement, is caused by the spring 19 and 20, which at the lower extremity is connected to the stationary portion of the frame, and at the upper end is connected to the end 6$^a$ of the limber pawl, and exert a downward pull thereon, and thus whenever the tooth of the limber pawl is released from the teeth of the escapement wheel, the said spring 19, 20 revolves said limber pawl upon its bearing, the end 6$^a$ moving downward for the arm to engage with the tumblers, and the toothed end 6$^b$ moving upward for the tooth to engage again with the escapement wheel at whatever position it is stopped by the engagement of the arm with the tumblers. The arm 19 is a spring arm attached at its forward end to a fixed part of the frame and 20 is a coiled spring, one end of which is attached to the free end of said spring arm 19 and the other end of which is secured to the arm 6$^a$, the construction being such that when the rocker arm O' is depressed it engages with the arm 19 to depress the same and thus exert tension on the arm 6$^a$.

In order to limit the rotation of the limber pawl to a definite degree and the corresponding movement of the carriage, the hub 5' is provided with an arm 6ª having its free end turned laterally to form an engaging finger 6ᶜ. As the hub 5' rotates, the arm and therewith the finger is carried with it, and by placing a stop in the path of movement of the finger, the movement of the arm and therewith of the escapement wheel and shaft may be limited. The greater the degree of movement of the stop arm, the greater the feed of the carriage and the shorter the movement of said arm, the shorter the feed of the carriage, and it is by varying the limit of rotary movement of this stop arm, that the different lengths of the steps in the feed of the carriage is attained.

A tumbler shaft 15 is mounted in the frame of the machine and on this tumbler shaft are loosely mounted, in the present instance three bell crank tumblers, shown at 2, 3 and 4 having horizontal arms 2', 3', 4' respectively, and which are adapted to rock on their shaft in planes parallel with the plane of movement of the stop arm 6ª. The tumbler 2 lies normally on one side of the path of finger 6ᶜ and the tumbler 3 lies normally to the other side of the path of finger 6ᶜ, while the tumbler 4 lies normally in the path of finger 6ᶜ. The upper end of the tumbler 4 comprises two steps 50 and 51, of which the step 50 is the lower and the step 51 lies normally in the path of the finger 6ᶜ. The tumbler 3 has a hook-shaped finger 52, the upper face of which is somewhat higher than the steps of tumbler 4. Tumbler 2 has a hook-shaped finger 53 which is somewhat higher than any of the other upper end faces of the tumblers. Thus, if the rocker or tumbler 2 be moved into the path of movement of finger 6ᶜ, the stop arm will have a minimum of rocking movement and hence the escapement wheel will have a minimum degree of movement and the carriage will be advanced its shorter step which, in the construction shown, is two units of motion. If the tumbler 3 be moved into the path of the finger 6ᶜ, the arm 6ª will have the next greater degree of movement or three units, if the step 51 be brought into the same position, the stop arm will have the next greater degree of movement, or four units, and if the step 50 be brought into the path of the stop arm, then the latter will have its greater degree of movement, or five units, and thus, depending upon the tumbler that is operated, the carriage will be permitted to have its four different lengths of movement.

Figure 9:
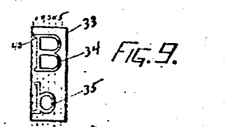
Fig. 9 is an elevation showing the type face of a type used in a two case machine.
Figure 10:
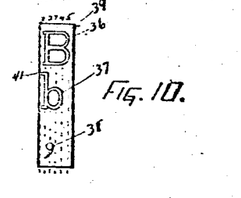

Fig. 9 illustrates the manner in which the widths of the letters, both small and capital are gaged. It will be seen that the face of the type is divided into five divisions, of which the small "b" occupies four degrees or units, while large B occupies five units. Hence, when the letter "b" small is struck, the carriage must be advanced four units to accommodate this letter, while, when the letter "B" is struck, the carriage must be advanced five units. As the upper step of the tumbler 4 represents four units, the operation of the "b" key does not shift any tumbler, but instead tumbler 4 is already in position to secure the desired result. When "w" is struck however, the tumbler 4 must be shifted to move its lower step into operative position. To thus move the tumbler 4, it is provided with an arm 4' from which depends the rod 12ᵈ, connecting with the keys 14, 14, by means of the equalizing bar 12ᵉ.

The arm 2' is connected by rods 12, 12ª and 12ᵇ, with the several keys corresponding to the letters requiring the two unit space, while the arm 3' is connected with the extra space bar 13 by the rod 12ᶜ, this being so constructed that it is operated by the keys that require the three unit space. As the capitals require more units than the small letters, additional or greater feed for the capitals must be provided. To give this additional movement when the capitals are struck, it is necessary that the stop arm 6ª be permitted to have a greater degree of rotation. For this purpose, the tumblers are mounted between collars 27 on the shaft 15, and this shaft is adapted for longitudinal or axial movement under the influence of a shift lever 42 connected with the shaft through the medium of a rod 11 having a collar 25 which is fixed on the shaft 15. A support H for the shaft 15 has a stop collar 26 disposed thereagainst, and which collar is upon the shaft 15, and acts to limit the rearward movement of the shaft under the influence of the shift lever, it being understood that this shift lever is the same as that used in shifting the carriage carrying bars to move the carriage for the upper and lower case letters. It will be seen that the tumblers are thus shifted bodily in a fore and aft direction.

The end or finger 6ᶜ has two steps, 6ᵈ and 6ᵉ, which lie alternately in position for engagement with the tumblers, as the tumbler shaft is reciprocated, and it will be seen that when the tumblers are in position for engagement by the step 6ᵈ, the feed of the carriage will be less than when the step 6ᵉ is in operative relation to the tumblers, and the escapement wheel will have a greater degree of rotation.

Figure 7:
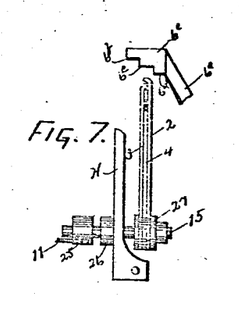
Fig. 7 is a view similar to Fig. 5 and showing a construction adapted for use with a double-shift machine.

In Fig. 7 is shown a construction wherein there are three different positions of the carriage, the punctuation marks requiring the minimum movements of the carriage, the lower case letters the next greater movement and the capitals or upper case letters the greatest movement of the carriage. The tumblers are normally in position to engage the step 6ᵉ for printing the lower case letters. Whenever it is desired to print capital letters, the capital shift key is depressed, which shifts the tumblers and the shaft 15 forward, until the tumblers are in position directly underneath the step 6$^f$, and whenever a capital letter is printed the said step 6$^f$ engages said tumblers, permitting a greater movement of the escapement wheel and carriage than when the lower case letters were printed and the tumblers engaged the step 6$^e$. Whenever it is desired to print figures and characters, the figure shift key is depressed, which shifts the carriage, and also the shaft 15 and the tumblers thereon, rearward to a position where the tumblers are directly underneath the step 6$^d$ of the arm, and whenever figures or characters are printed with the tumblers in this position, the tumblers engage said step 6$^d$, and limit the movement of the escapement wheel and carriage to a less distance than when lower case letters are printed and the tumblers engage step 6$^e$.

Figure 8:
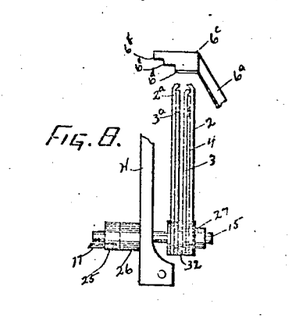
Fig. 8 is a view similar to Fig. 7 and showing two sets of tumblers one of which permits of greater movement of the carriage than the other, for capitals.

In the construction shown in Fig. 8, I have employed a second tumbler 2$^a$ of the same height as tumbler 2, and a second tumbler, 3$^a$ of the same height as tumbler 3; the said tumblers 2$^a$ and 3$^a$ are separated a short distance from the tumblers 2, 3, 4, and all of said tumblers 2, 2$^a$, 3, 3$^a$, and 4 are positioned normally for printing the lower case letters in position to engage the lowest step of the said arm, 6$^d$, and the said tumblers 2$^a$ and 2 give the same two unit space in printing the lower case letters, and the tumblers 3$^a$ and 3 give the same three unit space in printing the lower case letters. The arm of the loose pawl is arranged with three steps, as shown, which steps are of such length that when the tumblers are shifted forward in printing the capital letters, the tumblers 2$^a$ and 3$^a$ are brought directly underneath the highest step 6$^f$, and whenever one of the capital letters connected with said tumbler is printed, said tumbler will engage with the step 6$^f$ of the arm, and permit the carriage to move forward a greater distance than if it engaged the step 6$^e$. On the other hand, the tumblers 2, 3, 4 are brought forward by the same shift until they are directly underneath the step 6$^e$, and in printing capital letters connected therewith, will give the spaces provided for by said step 6$^e$. By this means, when the capital letters are printed, some may be connected with the tumblers 2, 3 and 4, and for the capital letters give one more unit of space than for the lower case letters, while others may be connected with the tumblers 2$^a$ and 3$^a$, which for the lower case letters give respectively the same spaces as the tumblers 2 and 3, and yet, when the capital letters are printed, because of their position being forward of the tumblers 2 and 3, when 2 and 3 are shifted a sufficient distance to engage step 6$^e$, the tumblers 2$^a$ and 3$^a$ are farther forward, and in position to engage the step 6$^f$ and give two units more to the capital letters connected therewith than to the corresponding lower case letters, thus permitting a greater latitude of variation between the lower case letters and their corresponding capital letters than would be permitted by either of the constructions shown in the other parts of the drawings.

Figure 25:
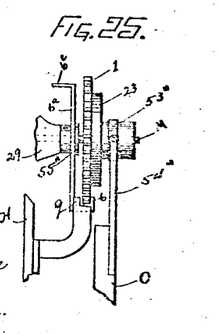
Fig. 25 is a modification showing a construction wherein the escapement wheel is moved into and out of operative relation to the pawls instead of the pawls being moved into and out of engagement with the wheel.

To limit the return movement of the limber pawl, an adjustable stop 18 is provided in the form of a thumb screw. By limiting the return movement of the limber pawl, the stop also limits the forward movement of the escapement wheel. Instead of the construction hereinbefore described the fixed pawl 9 may be rigidly mounted on the stationary bracket H as shown in Fig. 25. The limber pawl is formed without the hinged joint and is pivoted on the casting 29, being held in place by a nut 55'' so that neither of the feed pawls has any motion fore and aft of the machine, but the limber pawl has a rotary movement about its pivot. The escapement wheel is arranged to be reciprocated back and forth so as to engage first one of the pawls and then the other. To this end a collar 53'' is fixed on the rear end of the shaft M and is formed with an annular groove that is engaged by an arm 54'' rigidly mounted on the rocker arm O. The limber pawl is formed with a wing 6$^e$ that is similar to the corresponding wing in the construction already described and that coöperates in the same way with the means for variably arresting said pawl. If desired, the fixed pawl may also be mounted centrally with the escapement wheel, the same as the limber pawl, by constructing the parts as shown in Fig. 12, in which 9$^a$ is mounted upon said hub and 9$^c$ is connected therewith by means of the hinge joint 9$^b$, with the tooth 9, as shown. The outer curved edge of 9$^c$ takes the place of the guide 17 heretofore shown, and the part 9$^c$ is adapted to be pushed forward and backward by the rocker arm as heretofore.

The part 8, Figs. 15, 16 and 17, is formed to serve as a latch to hold said limber pawl and therewith the escapement wheel from turning backward when the carriage is moved backward for any reason. The said latch is mounted upon the left-hand face of the rocker arm O by means of a pivot pin 8$^d$ (Fig. 15) passing through said rocker arm and having a nut 8$^e$ threaded thereon to hold said pin in place. A spring 30 presses the arm 8 toward the front of the machine, its motion in that direction being normally limited by a stop screw 21 threaded through an arm 8$^c$ projecting from the arm 8, said stop screw contacting with the rear face of the rocker arm O. An arm 8$^a$ is bent off from the arm 8 and has the shape best shown in Fig. 17. This arm has a face that stands at an inclination, such that when the loose pawl moves with the escapement wheel 1 in the stepping motion of the carriage, said loose pawl strikes the inclined face of the arm 8$^a$ and moves said arm toward the rear of the machine, the loose pawl thus moving past the arm. The arm $8^a$ then snaps in behind the loose pawl and serves as a latch to prevent backward motion of said pawl and the escapement wheel when the carriage is moved toward the right. When the dog rocker is operated a finger $8^b$ of the arm 8 strikes the escapement wheel and prevents the arm 8 and latch $8^a$ from moving as far toward the front of the machine as the loose pawl moves. The loose pawl thus moves out from behind the latch and is returned for a new step by the spring 19, 20.

The machine is provided with a carriage scale mounted as usual on the stationary framework. Instead of the ordinary scale, there may be used the special scale 60 shown in Fig. 24. The graduations of this scale correspond to the feed units of the carriage feed mechanism, so that said graduations are finer than those ordinarily used. In order to avoid crowding, the even numbered graduations are drawn above, and the odd numbered graduations below, a line extending longitudinally of the scale. The upper graduations are numbered in the ordinary manner, from left to right. A second series of numbers from right to left, is placed adjacent the lower graduations. An index mounted on the carriage, will show the position of the carriage at any time, by reference to the upper series of numbers. At the same time, by reference to the lower series of numbers, the operator may see at once the number of feed units remaining to be written upon before the end of the line is reached.

To enable any operator to remember the number of units given, to each letter, I have indicated the spacing upon the key as shown in Figs. 18 and 19, in which 44 and 45 are the respective keys in the key levers 61 and 62.

In place of the ordinary spring for imparting the movement to the limber pawl required, I employ the spring arm 19, which is attached to the limber pawl by the wire 20, which may be a coiled spring, if desired, or any other suitable connection, the other end of said spring is attached to the frame or some stationary part of the machine, as 24, with the spring 19 in contact with the movable portion of the rocker arm, as $O^1$. By this construction the normal pull of said spring upon said arm of the pawl may be almost nothing, yet when the rocker arm is operated in the printing of a letter, the rocker arm presses down the portion of the spring in contact therewith, and the end connected with the limber pawl exerts an increased tension upon the limber pawl. As soon as the rocker arm recedes and the escapement wheel is released from the rigid pawl for its forward movement, the tension of the spring 19 is diminished to its normal, and consequently offers very slight resistance to the forward movement of the said escapement wheel. By this the spring may be constructed to give a very strong pull upon the limber pawl when operated as aforesaid, and thus accelerate its speed when moving from the wheel, and yet the tension of said spring is so diminished that it permits the carriage to move forward without any retarding effect, as is usual where the tension of said spring is greatly increased.

Figures 26, 27, 28, 29:
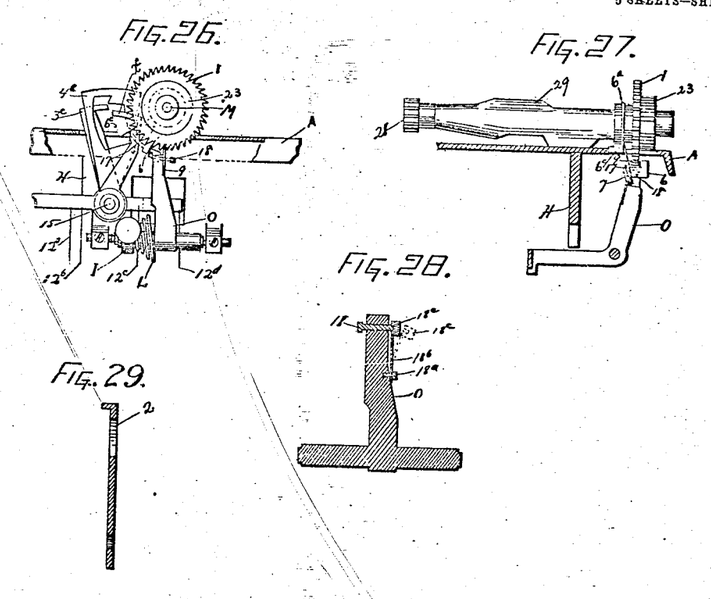
Fig. 26 shows a modification of the construction wherein the escapement is reverse to that shown in the figures above described.
Fig. 27 is a side elevation of the construction shown in Fig. 26.
Fig. 28 shows an auxiliary stop for varying the spaces.
Fig. 29 is a sectional view of a modification of the tumbler.

In Figs. 26 and 27, I have shown a variation of the tumblers and pawls by means of which they give the reverse escapement, or the forward movement of the carriage upon the downward stroke of the key. To accomplish this result, the fixed pawl is in engagement with the escapement wheel when the carriage is at rest, as shown Fig. 27, and the limber or loose pawl is out of engagement as shown, and situated upon the left hand side of the fixed pawl in the drawing, as shown in Fig. 26. The tumblers have openings therein, as shown in Fig. 26, with the upper inside portions stepped, exactly the reverse of those heretofore shown, and adapted to engage the arm of the loose pawl as it moves upward on the forward movement of said carriage, and limit such forward movement of said carriage to the distance required for the letter printed. The operation of the said pawls is exactly the reverse of that heretofore shown, and the fixed pawl being in engagement with the escapement wheel, whenever the letter is struck, the fixed pawl is moved out of engagement with said wheel by means of the space bar and the rocker arm O, thus releasing the said escapement wheel, and permitting it and the carriage to move forward; by the same movement of the rocker arm and the curved arm or guide 17, attached thereto, the loose pawl is moved into engagement with the said escapement wheel, and is carried forward by it on its forward movement, until the arm thereof engages one of the steps of the tumblers, limiting such forward movement. Upon the release of the key lever, the fixed pawl is returned to its original position in engagement with the teeth of the wheel by the return movement of the rocker arm under the pressure of the spring L, and the loose pawl is moved out of its engagement with the wheel by the curved arm 17, and the force of the spring 19—20 (not shown) returns the said loose pawl to its initial or starting point, in readiness for the spacing of another letter. In all other respects the said parts are made and connected in the same manner as heretofore shown, and their operation is the same as heretofore described, excepting as herein just specified.

In Fig. 28, I have shown an auxiliary stop, by means of which it is possible to quickly change the distance spaced by each key, by inserting it between the end of the stop 18 and the limber pawl, for the regular distance for said escapement, and then increase the distance by removing it therefrom and permitting the loose pawl to stop in engagement with the end of said stop 18. The said auxiliary stop is secured to the rocker arm O by means of the screw 18ª, and at the upper end of the body, 18ᵇ, is the cap 18ᶜ, which is adapted to fit over the end of the screw 18, and stop the loose pawl a certain distance from the end of said screw 18. By this means the loose pawl is stopped at the proper distance from the fixed pawl for ordinary writing by the engagement with said auxiliary stop, and prevented from further forward movement. Whenever it is desired to give a more open space to the letters, the auxiliary stop is sprung back, as shown by the dotted lines, and is then turned to one side out of engagement with the screw 18, and out of the path of the loose pawl, and the loose pawl then moves forward until it is stopped when it comes into engagement with the end of stop 18, at one tooth farther forward than when it stopped in engagement with the auxiliary stop. From this position, whenever a letter is printed, the loose pawl travels through one more tooth distance, before the arm comes into engagement with the tumbler operated by said key, and upon the forward movement of the carriage, it is permitted to pass through one more tooth distance of space before it is stopped by the stop 18. This gives to each letter one more unit of space, and produces a more open writing and one desired and preferred by some for special purposes.

Figure 1:
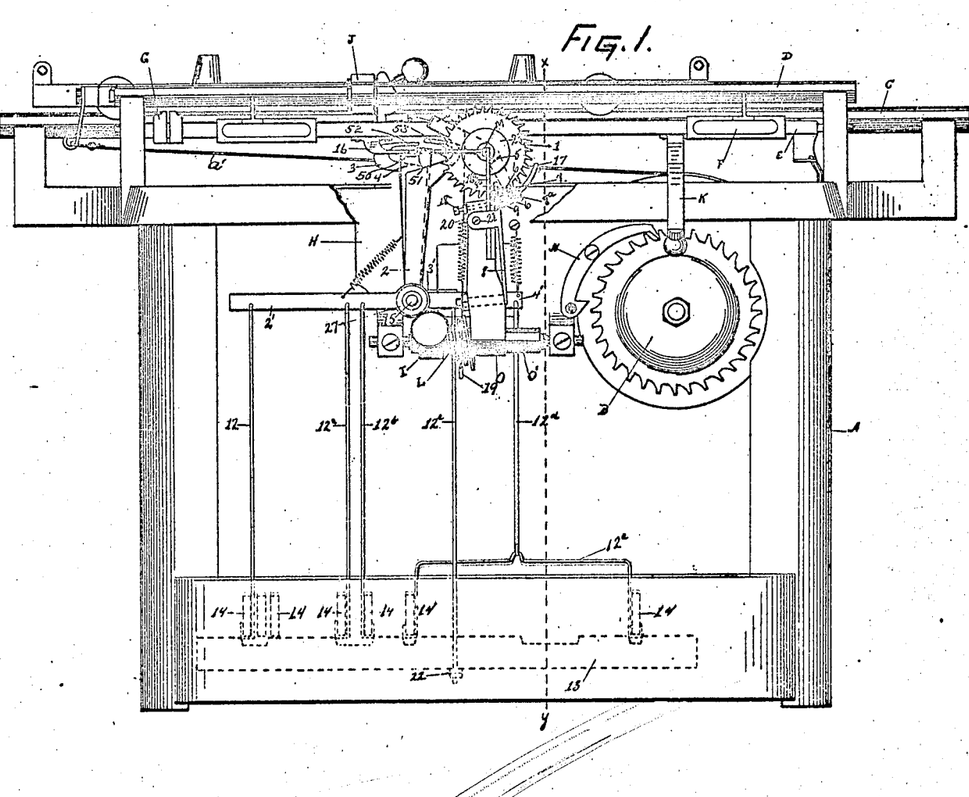
—Figure 1 is a rear elevation showing a common form of typewriter equipped with the present invention, a portion of the frame being broken away to show the escapement mechanism more clearly.
Figure 2:
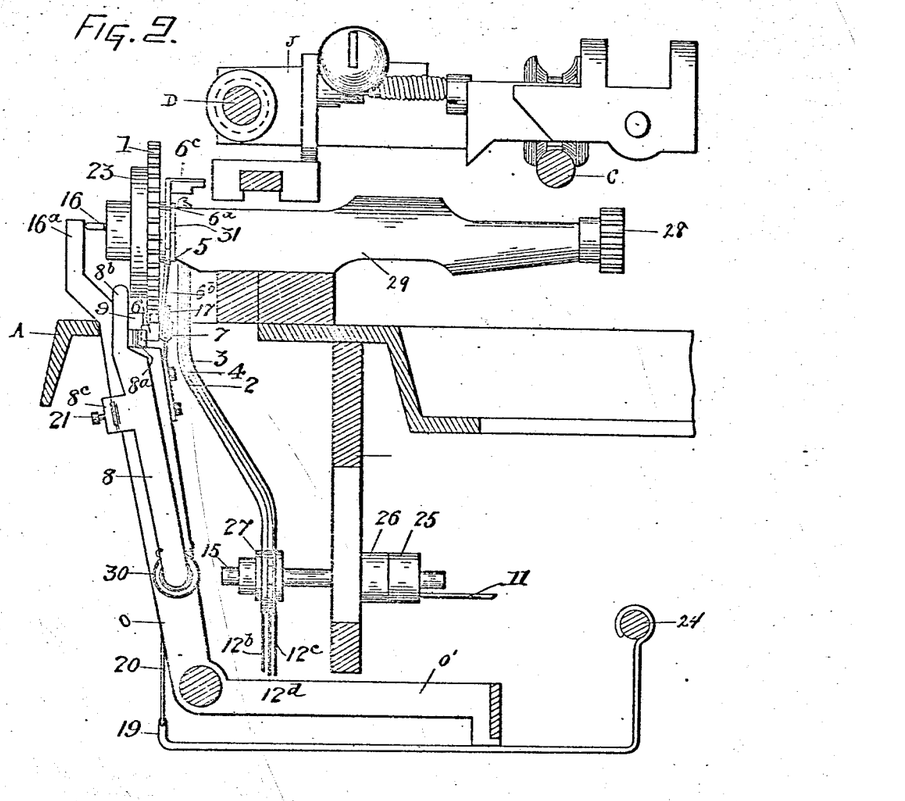
Fig. 2 is a view partly in section and partly in elevation, and showing the parts of the escapement mechanism in their normal positions.
Figure 3:
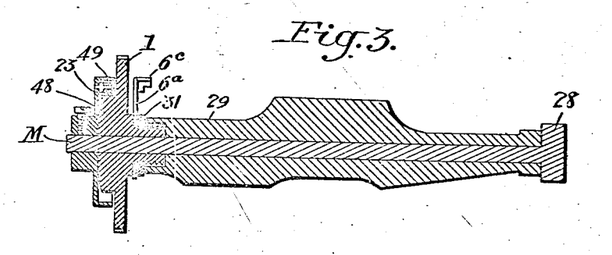
Fig. 3 is a sectional view in the plane of the shaft M, showing the connections between the said shaft M and the escapement wheel and the cap 23.
Figure 4:
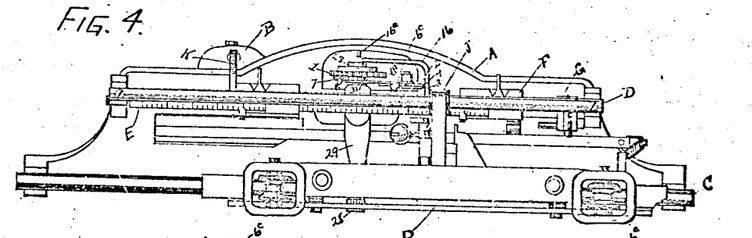
Fig. 4 is a top plan view showing the rear portion of the frame of the typewriter with the present mechanism thereon.
Figure 5:
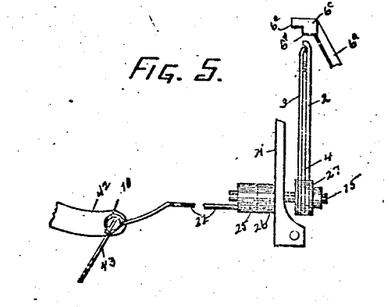
Fig. 5 is a detailed elevation showing a set of tumblers with the rocker-extension of the limber pawl and the means for shifting the tumblers for operative engagement by different portions of said extension to correspond to upper and lower case characters.
Figure 6:
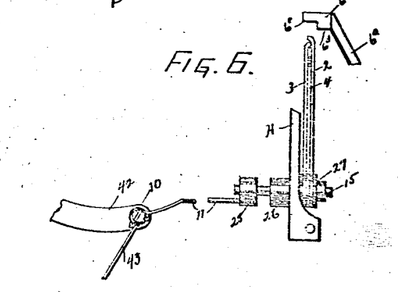
Fig. 6 is a view similar to Fig. 5 and showing the tumblers positioned in operative relation to the upper case characters.

The machine to which I have shown my improvements applied is the well-known Remington No. 6 typewriting machine, and comprises the line lock mechanism, usual in this machine. A rod E is slidably mounted in lugs rising from the top plate of the machine and is normally held toward the left, as viewed in Fig. 1, by a spring. An arm 16 fixed to this rod has its end behind the end of the shaft M and nearly but not quite in the path of an arm 16ª, which is integral with or secured to the rocker arm O. When a line is nearly completed, a tappet mounted on the carriage engages a stop F adjustable along the rod E and presses said stop and said rod a short distance to the right, as viewed in Fig. 1. This brings the arm 16 in front of the arm 16ª and locks the rocker O against motion. As this rocker is connected to the universal bar which extends under all of the key levers, the keys are thus locked against further operation.

What is claimed is:—

1. In a typewriter, the combination with the carriage and the escapement wheel therefor, of a limber pawl mounted concentric with the wheel and mounted for alternate movement with and free thereof, tumblers mounted to be shifted bodily and rocked into the path of movement of the pawl, means whereby said key levers rock said tumblers, means for shifting said tumblers bodily, and a rigid pawl movable in a plane at an angle to the first-named pawl for movement of the latter into and out of engagement with the escapement wheel and adapted to engage the escapement wheel alternately with said first named pawl.

2. In a typewriter, the combination with the carriage and the escapement wheel therefor, of a limber pawl mounted for alternate movement with and free from the wheel, tumblers mounted to be shifted bodily and rocked into the path of the pawl to limit the movement thereof in one direction, connections between said tumblers and their respective key levers for effecting one of said movements, means for effecting the other of said movements, and a second pawl adapted for engagement with the escapement wheel interchangeably with the first named pawl and during the free movement of said first-named pawl, said second pawl having connections with the first pawl for moving it into and out of engagement with the wheel.

3. In a typewriter, the combination with the carriage and the escapement wheel therefor, of a rotatable pawl adapted for movement into and out of engagement with the wheel, said pawl having a stepped portion, and tumblers mounted for movement into the path of the pawl to limit the movement thereof, keys, means whereby certain of said keys control the movements of tumblers into the path of the pawl, said tumblers being also mounted for bodily movement into and out of operative relation to the different steps of the pawl, and means for effecting such bodily movement.

4. In a typewriter, the combination with the carriage and the escapement wheel thereof, of a movable pawl adapted for movement alternately with and free from the wheel and having a stepped portion, and a tumbler operatively connected with a key for movement thereby into and out of the path of movement of the pawl to determine the movement thereof, said tumbler being movable into and out of operative relation to the several steps of the pawl to permit of different movements of the latter.

5. In a typewriter, the combination with the carriage and the escapement wheel thereof, of a pivoted pawl adapted for movement alternately with and free from the wheel and having a stepped portion, and a stepped tumbler having connection with a key for movement thereby to present its steps interchangeably in the path of the stepped portion of the pawl to limit the movement of the pawl to different degrees, said tumbler being bodily movable into operative relation to the steps of the pawl interchangeably.

6. In a type-writer, the combination with the carriage and the escapement wheel, of a plurality of tumblers connected with their respective keys, and means movable with the wheel for engagement with the tumblers and having stepped engaging faces, and means for shifting the tumblers into and out of operative relation to the different faces.

7. In a type-writer, the combination with the carriage, of an escapement including a rotatable pawl adapted for movement into and out of operative relation to the coöperating elements of the escapement and for movement therewith when in operative relation thereto, and a tumbler having stepped faces one of which lies normally in the path of the pawl, said tumbler having means for moving it to dispose its steps interchangeably in the path of operative movement of the pawl to limit the movement thereof.

8. In a typewriter the combination with the carriage, of an escapement including a pawl adapted for movement into and out of operative relation to govern the movement of the carriage, tumblers adapted for movement into the path of said pawl to limit its movement in one direction, means for limiting movement of the pawl in the other direction, means for limiting the longitudinal bodily movement of the tumblers, a second pawl adapted for movement into and out of operative relation interchangeably with the first-mentioned pawl, means for governing the movement of the second-mentioned pawl, a spring having connection with one of the pawls, and means for increasing the tension of said spring.

9. In a type-writer, the combination with a carriage and an escapement shaft, of an escapement wheel mounted on the shaft, a rocker, a rigid pawl carried by the rocker for engagement with the wheel, an arcuate guide on the rocker concentric with the shaft, a limber pawl mounted on the shaft and having slidable connection with the guide to permit of pivotal movement of the limber pawl and for lateral movement thereby into and out of engagement with the wheel, and means for limiting the movement of the limber pawl with the wheel to limit the movement of the carriage.

10. In a type-writer, the combination with the carriage and an escapement shaft, of an escapement wheel on the shaft, a limber pawl pivoted on the shaft, a rocker having a rigid pawl for movement into and out of engagement with the wheel, connections between the rocker and limber pawl for moving the latter into and out of engagement with the wheel, variable means for limiting the movement of the limber pawl with the ratchet to limit the movement of the carriage, and an adjustable stop on the rocker for limiting the return movement of the limber pawl.

11. In a type-writer, the combination with the carriage and an escapement wheel operatively connected therewith, of a pawl adapted for movement alternately with and free from the wheel, variable means for limiting the degree of movement of the pawl with the wheel, rocker, an arcuate guide carried by the rocker and with which the pawl is slidably connected and by which it is movable into and out of engagement with the wheel, adjustable means for limiting the return movement of the pawl when free from the wheel, and a pawl carried by the rocker for engagement with the wheel alternately with the first pawl.

12. In a type writer, the combination with the carriage, and the escapement rack therefor, of a plurality of tumblers connected with their respective keys, means movable with the escapement rack and adapted to engage with the tumblers, means for shifting the tumblers into and out of operative relation with said movable means, a means for engaging the escapement interchangeably with the said movable means, means for limiting the movement of the said movable means, means for limiting the bodily shifting movement of the tumblers, a spring having connection with said movable means, and means for increasing the tension of said spring.

13. In a type writer, the combination with the carriage and the escapement wheel therefor, of a pawl adapted for alternate movement with and free from the wheel, tumblers having connection with their respective key-levers for movement thereby into the path of movement of the pawl, a second pawl adapted for engagement with the said wheel interchangeably with the first-mentioned pawl, and means connected with one of the pawls to slidably contact with the other pawl to move the latter out of engagement with the escapement wheel.

14. In a typewriter, the combination with the carriage and the escapement wheel therefor, of a pawl adapted for movement alternately with and free from the wheel, tumblers adapted for movement into the path of the pawl to limit the movement thereof in one direction and determine the movement of the carriage, said tumblers having operative connection with their respective key-levers, a rocker arm having a pawl for engagement with the escapement wheel interchangeably with the first-mentioned pawl, connections between the pawls for movement one by the other into and out of engagement with the escapement wheel, and means for returning the first-mentioned pawl when disengaged from the wheel.

15. In a type writer, the combination with the carriage and the escapement wheel therefor, of a pawl adapted for movement into and out of engagement with the wheel, tumblers connected with their respective key-levers and adapted for movement into the path of movement of the pawl to limit movement thereof in one direction, said tumblers being adapted for bodily and rocking movement into and out of operative relation to the pawl, and means for imparting such movements to said tumblers.

16. In a type writer the combination with the carriage and the escapement wheel therefor, of a pawl adapted for movement into and out of engagement with the wheel, tumblers connected with their respective key-levers and adapted for movement into the path of movement of the pawl to limit movement thereof in one direction, said tumblers being adapted for bodily and rocking movement into and out of operative relation to the pawl, and means for moving the pawl when free from the wheel.

17. In a type writer, the combination with the carriage and the escapement wheel therefor, of a rotatable pawl adapted for movement into and out of engagement with the wheel, said pawl having a stepped portion, tumblers connected with their respective keys for movement into the path of movement of the pawl to limit the movement thereof in one direction, means for moving said tumblers bodily into and out of operative relation to the different steps of the pawl, a spring having connection with the said pawl, means for placing the said spring under tension, a second pawl adapted for engagement with the escapement wheel interchangeably with the first pawl, and means connected with one of the pawls adapted to contact with the other pawl to move it out of engagement with the escapement wheel.

18. In a type writer, the combination with the carriage and the escapement wheel therefor, of a plurality of tumblers connected with their respective keys, means movable with the escapement wheel and adapted to engage the tumblers, means for shifting the tumblers bodily and rocking them into and out of operative relation with said movable means, means for engagement with the wheel interchangeably with the said movable means, and variable means for limiting the movement of the said movable means with relation to the escapement wheel.

19. In a typewriter, the combination with the carriage and the escapement wheel therefor, of a plurality of tumblers connected with their respective keys, means movable with the wheel for engagement therewith and with the tumblers, means for shifting the tumblers bodily and rocking them into and out of operative relation with said movable means, means for engagement with the wheel interchangeably with said movable means, means for placing said movable means under tension, and variable means for limiting the return movement of the said movable means with relation to the escapement wheel.

20. In a type writer, the combination with the carriage having a rack, of an escapement shaft operatively engaged with the rack, an escapement wheel mounted on the shaft, a rocker, a pawl carried by the rocker for engagement with the wheel, a guide on the rocker, a limber pawl mounted on the said shaft and having slidable connection with the guide to permit of pivotal movement of the limber pawl and for lateral movement thereby into and out of engagement with the wheel, means for limiting the movement of the limber pawl with the wheel to limit the movement of the carriage, a spring having connection with the limber pawl, means for placing said spring under tension, and tumblers adapted for individual movement into the path of the said pawl, said tumblers having operative connection with their respective key-levers.

21. In a type writer, the combination with the carriage, of an escapement including a pawl adapted for movement into and out of operative relation to govern the movement of the carriage, rocking tumblers co-acting with said pawl, means for shifting said tumblers axially and means for limiting the axial movement of the tumblers.

22. In a typewriter, the combination with the carriage and keys, of an escapement including a pawl, tumblers mounted for individual movement into the path of the pawl, key-controlled means for effecting such movements, and key-controlled means for placing the pawl under tension.

23. In a type writer, the combination with the carriage, of an escapement including a wheel and a pawl, a second pawl adapted for movement into engagement with the wheel interchangeably with the first-mentioned pawl, tumblers adapted for movement into and out of engagement with the first-mentioned pawl, means for placing the first-mentioned pawl under tension, and means for shifting the tumblers bodily.

24. In a type writer, the combination with the carriage, of an escapement including a wheel, a limber pawl adapted for movement into and out of engagement with the said wheel, a second pawl adapted for engagement with the wheel interchangeably with the first-mentioned pawl, the first-mentioned pawl having a stepped portion, tumblers adapted for movement into the path of the limber pawl, and means for placing the limber pawl under tension.

25. In a typewriter, the combination with the carriage, of an escapement dog, tumblers mounted for bodily and rocking movement into the path of said dog, and means for holding said dog against backward movement during the return movement of the carriage.

26. In a typewriter, the combination with the carriage, of an escapement dog, tumblers mounted for movement in two planes into the path of said dog, means for placing said dog under tension, and means for holding said dog against backward movement during the return movement of the carriage.

27. In a type writer, the combination with the carriage, of an escapement including a pawl, tumblers means for moving said tumblers individually into the path of the pawl, means for placing the pawl under tension, means for holding the escapement during a rearward movement of the carriage, and means for shifting the tumblers bodily.

28. In a type writer, the combination with the carriage, of an escapement including a wheel, and also a limber pawl adapted for movement into and out of engagement with the wheel, tumblers connected with their respective keys and adapted for movement into the path of the said pawl to limit movement thereof in one direction, a second pawl adapted for engagement with the escapement wheel interchangeably with the limber pawl, means connected with one pawl adapted to contact with the other pawl to move it out of engagement with the escapement wheel, means for bodily shifting the tumblers, and means for holding the escapement wheel against backward movement during a rearward movement of the carriage.

29. In a type writer, the combination with the carriage, having a rack, of an escapement shaft operatively engaged with the rack, an escapement wheel mounted on the shaft, a rocker, a pawl carried by the rocker for engagement with the escapement wheel, a guide on the rocker, a limber pawl mounted on the said shaft and having slidable connection with the said guide to permit of pivotal movement of the limber pawl and for lateral movement thereby into and out of engagement with the escapement wheel, means for limiting the movement of the limber pawl with the wheel to limit the movement of the carriage, tumblers adapted for movement into the path of the limber pawl, and means for holding the escapement wheel against backward movement during the rearward movement of the carriage.

30. In a type writer, the combination with the carriage having a rack, of an escapement shaft operatively engaged with the rack, an escapement wheel mounted on the shaft, a rocker, a rigid pawl carried by the rocker for engagement with the escapement wheel, a guide on the rocker, a limber pawl mounted on the said shaft and contacting with the said guide to permit of a pivotal movement thereof and for lateral movement thereby into and out of engagement with the escapement wheel interchangeably with the said rigid pawl, means for limiting the movement of the limber pawl with the escapement wheel to limit the movement of the carriage, tumblers adapted for movement into the path of the limber pawl, and means carried by the rocker to hold the escapement wheel and the limber pawl against backward movement when the carriage is moved rearwardly.

31. In a type writer, the combination with a carriage, of an escapement dog adapted for movement into and out of operative engagement to govern the movement of the carriage, tumblers mounted to be shifted bodily and rocked into the path of the escapement dog, means for effecting such movements, and means for placing the escapement dog under tension.

32. In a type writer, the combination with the carriage, of an escapement including a wheel and a pawl adapted for movement into and out of operative relation to govern the carriage, a spring having connection with the pawl, means for increasing the tension of the spring, tumblers adapted for movement into the path of the said pawl, a second pawl adapted for movement into and out of operative relation interchangeably with the first-mentioned pawl, means for governing the movement of the second-mentioned pawl, and adjustable means for limiting the return movement of the first-mentioned pawl.

33. In a typewriter, the combination with the carriage and an escapement shaft, of an escapement wheel mounted on the shaft, a ratchet wheel carried by the escapement wheel and means acting upon said ratchet wheel to permit of a free rotation of the escapement shaft when the carriage is retracted, a rocker, a pawl carried by the rocker for engagement with the wheel, a guide mounted upon the rocker concentric with the shaft, a limber pawl mounted on the shaft and having slidable connection with the guide to permit of a pivotal movement of the limber pawl and for lateral movement thereby into and out of engagement with the wheel, and means for limiting the movement of the limber pawl with the wheel to limit the movement of the carriage.

34. In a typewriter, the combination with the carriage, of an escapement therefor including a pawl adapted for movement into and out of operative relation to govern the movement of the carriage, a rocker carrying a pawl adapted for movement into and out of operative relation interchangeably with the first-mentioned pawl, a guide mounted upon the rocker, the first-mentioned pawl having slidable connection with the guide to permit of a pivotal movement thereby into and out of engagement with the escapement wheel, tumblers for coöperation with the first-mentioned pawl, and means mounted upon the rocker to lock the escapement wheel during the return movement of the carriage.

35. In a typewriting machine, the combination with a carriage, of an escapement therefor including a stepping dog, tumblers for coöperation with said stepping dog, a rocker, and means mounted upon the rocker and engaging said stepping dog to hold the escapement against backward motion during the return movement of the carriage.

36. The combination with a movable carriage, of an escapement comprising a limber pawl, an adjustable stop for said limber pawl, and means adapted to be interposed between the stop and the pawl to vary the number of feed units imparted by the pawl at the actuation thereof, said means being adjusted by the adjustment of said stop.

37. The combination with a carriage, of step-by-step feed devices comprising a limber pawl, a set screw for limiting the motion of said pawl, and a block movably mounted and adapted to be interposed between said set screw and said pawl to vary the distance through which said pawl moves at each actuation thereof, said means being adjusted by the adjustment of said set screw.

38. The combination with a movable carriage, of an escapement for controlling the movement of said carriage, comprising a limber pawl, means coöperating with said limber pawl at one end of its stroke variably to limit its motion in one direction, and independent means coöperating with said limber pawl at the other end of its stroke variably to limit its motion in the other direction.

39. The combination with a movable carriage, of an escapement for controlling the movement of said carriage, comprising a limber pawl, means controlled by the character keys of the typewriter for variably limiting the motion of said limber pawl in one direction according to the width of the several characters printed, and independent means for variably limiting the motion of said limber pawl in the opposite direction to vary the spacing between the characters.

40. In a typewriting machine having a movable carriage, character printing keys and a case-shift device, the combination of carriage feeding means, means for controlling said carriage feeding means according to the particular character key operated; means for controlling said carriage feeding means controlled by said case-shift device; and means for controlling said carriage feeding means to vary the width of spacing between the characters.

41. The combination with a movable carriage, of step-by-step feed devices for said carriage, and three different means for varying the length of a step of said carriage, one of said means being adapted to be set by hand and maintained in set position and another of said means depending upon the printing key operated.

42. The combination with a carriage, of an escapement comprising a limber pawl, a tumbler adapted to limit the motion of said limber pawl, means for moving said tumbler into the path of said pawl and a case shift device adapted to move said tumbler.

43. The combination with a carriage, of an escapement comprising a stepped limber pawl, a stepped tumbler coöperating with said limber pawl, and means for moving said tumbler to bring any desired step of said limber pawl into position for engagement with any desired step of said tumbler.

44. The combination with a carriage, of escapement mechanism comprising a limber pawl and a tumbler adapted to coöperate therewith, and means for moving said tumbler in either of two different planes.

45. The combination with a movable carriage, of an escapement mechanism for controlling said carriage comprising an escapement rack, a limber pawl and a detent engaging said limber pawl, to prevent backward movement thereof when said limber pawl is in engagement with said rack.

46. The combination with a movable carriage, of an escapement mechanism for controlling said carriage, comprising an escapement rack, a rocker, a stiff pawl and a limber pawl, and a detent carried by said rocker and engaging said limber pawl, to prevent backward movement thereof when said limber pawl is in engagement with said rack.

47. The combination with a movable carriage, of an escapement mechanism for controlling said carriage, comprising a rocker, a stiff pawl and a limber pawl, and a detent carried by said rocker and normally engaging said limber pawl to prevent backward movement thereof but disengaged therefrom when said rocker is operated.

48. The combination with a movable carriage, of an escapement wheel for controlling said carriage, a rocker, a limber pawl normally engaging said escapement wheel, a stiff pawl engaging said escapement wheel alternately with said limber pawl, and a latch connected to said rocker and normally engaging said limber pawl.

49. The combination with a carriage, of step-by-step feed devices for said carriage comprising a ratchet and a limber pawl, said limber pawl having a movement with said ratchet, and a return movement free from said ratchet, a series of keys, a universal member operated by any of said keys, and means operatively connected to said universal member for imparting said return movement to said limber pawl.

50. The combination with a carriage, of an escapement comprising a limber pawl, said limber pawl having a carriage feeding movement and a return movement, a universal member, and means operatively connected to said universal member for imparting said return movement to said limber pawl.

51. The combination with a carriage, of an escapement comprising a limber pawl, a spring controlling said limber pawl, and means for varying the tension of said spring at each operation of said escapement.

52. The combination with a carriage, of a step-by-step feed device comprising a limber pawl, a spring controlling said limber pawl, and a rocker operating to vary the tension of said spring.

53. The combination with a carriage, of a step-by-step feed device for said carriage comprising a ratchet, a limber pawl normally engaging said ratchet, a spring controlling said limber pawl, and a rocker adapted to operate said limber pawl and to increase the tension of said spring.

54. In a typewriting machine, the combination with a carriage, of an escapement mechanism comprising a limber pawl and a rack, an arm connected to a stationary part of the machine and imparting backward motion to said limber pawl in a direction parallel with said rack, and a universal member engaging said arm.

In testimony whereof, I have hereunto set my hand this 22nd day of January, 1901.

CHESTER W. BROWN.

Witnesses:
C. E. BROWN,
H. E. EDWARDS.